United States Patent [19]

Ward

[11] Patent Number: 5,405,222
[45] Date of Patent: Apr. 11, 1995

[54] REVOLUTE MOTION MACHINE TOOL

[75] Inventor: Allen C. Ward, Ann Arbor, Mich.

[73] Assignee: The Regents of the University of Michigan, Ann Arbor, Mich.

[21] Appl. No.: 104,889

[22] Filed: Aug. 10, 1993

[51] Int. Cl.⁶ .............................................. B23C 1/12
[52] U.S. Cl. .................................. 409/201; 409/211; 409/216; 409/224
[58] Field of Search ................ 409/191, 199, 201, 211, 409/216, 224; 408/89, 91, 236, 237

[56] References Cited

U.S. PATENT DOCUMENTS

| | | | |
|---|---|---|---|
| 1,420,319 | 6/1922 | Kelley | 408/89 |
| 2,281,355 | 4/1942 | Hubbard . | |
| 2,638,136 | 5/1953 | Miller | 409/199 |
| 3,359,861 | 8/1965 | Johnson et al. . | |
| 3,371,580 | 3/1968 | Barnes et al. | 408/89 |
| 3,712,175 | 1/1973 | Muller et al. . | |
| 3,806,691 | 4/1974 | Roach . | |
| 3,823,644 | 7/1974 | Mello . | |
| 3,923,086 | 12/1975 | Spohn, Jr. . | |
| 4,478,540 | 10/1984 | Sachot . | |
| 4,589,174 | 5/1986 | Allen . | |
| 4,610,584 | 9/1986 | Malzkorn et al. . | |
| 4,657,453 | 4/1987 | Goulot et al. . | |
| 4,664,570 | 5/1987 | Tsukiji et al. . | |
| 4,817,697 | 4/1989 | Takami et al. . | |
| 5,002,443 | 3/1991 | Yang . | |
| 5,028,180 | 7/1991 | Sheldon et al. . | |
| 5,238,340 | 8/1993 | Ochiai et al. | 409/211 |

OTHER PUBLICATIONS

Zero-Backlash Drive Helps Satellites Communicate, Copyright 1991.

*Primary Examiner*—Daniel W. Howell
*Attorney, Agent, or Firm*—Harness, Dickey & Pierce

[57] ABSTRACT

This invention relates to a machine tool providing a unique approach towards positioning and movement for a workpiece and tool in numerical control machine tool applications. The goal is to provide decrease machine costs and maintenance. Current machine tools such as milling machines principally rely on linear sliding mechanisms to position a table and workpiece relative to a spindle and provide motion for cutting. In accordance with this invention motion and positioning is achieved through less cost and readily available mechanisms through use of a plurality of revolute joints. Arms are provided having tangential actuators featuring extremely high stiffness and zero backlash actuator capable of a high degree of positioning accuracy. The arms resemble three dimensional truss structures for added structural stiffness characteristics. Preferably a cable drum type tangential actuator is employed in conjunction with this invention. A number of revolute arms can be linked together each providing revolute motion about offset axes to provide number of degrees of revolute motion required for a given application.

15 Claims, 4 Drawing Sheets

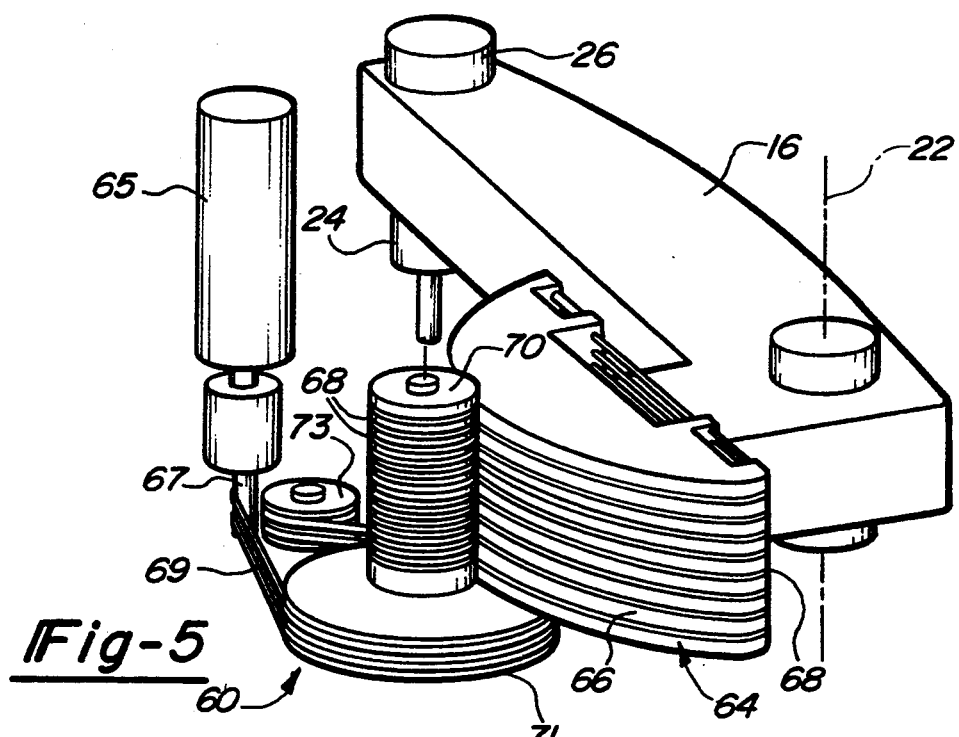
Fig-5
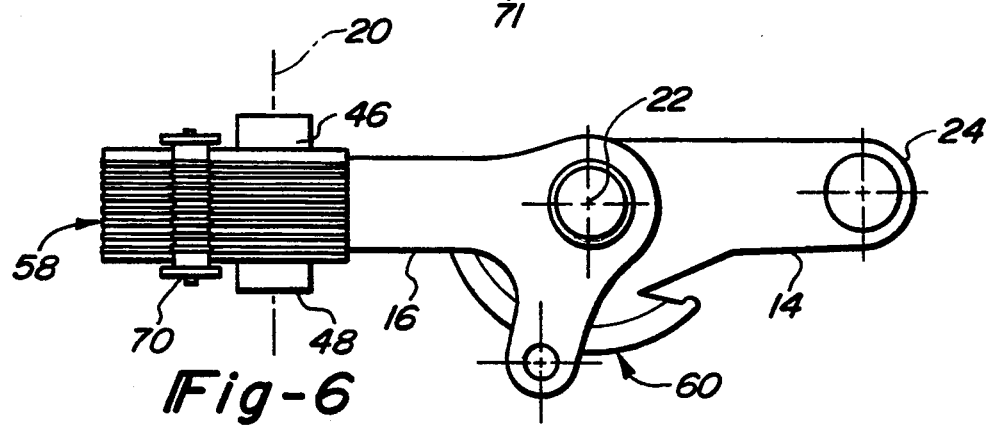
Fig-6
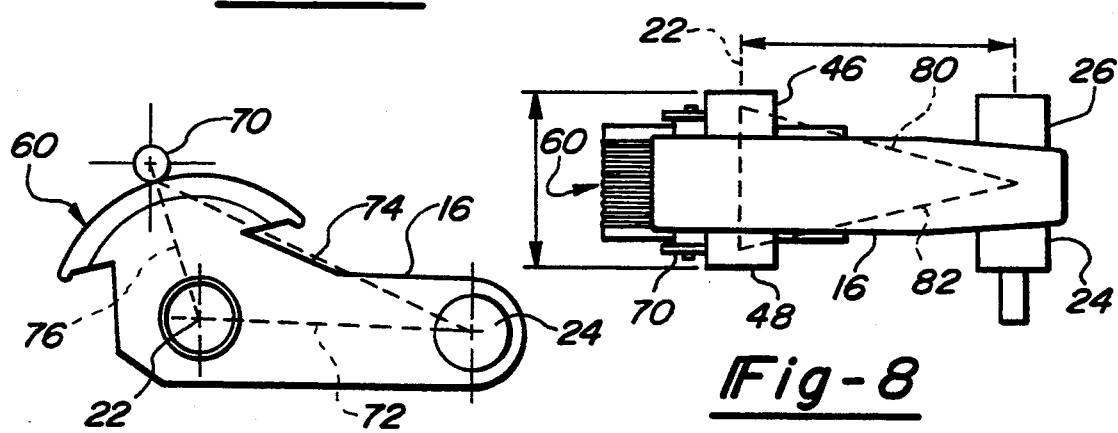
Fig-7
Fig-8

REVOLUTE MOTION MACHINE TOOL

BACKGROUND AND SUMMARY OF THE INVENTION

This invention relates to numerically controlled machine tools such as milling machines providing relative positioning and movement between a workpiece and tool based on revolute motion.

Current numerically controlled milling machines rely on linear sliding mechanisms to position the workpiece relative to the spindle, and provides motion for cutting. Such linear motion requires very high precision linear bearing elements which are expensive to make and to maintain. Long and true flat surfaces are also expensive to produce and maintain (often they are ground by hand), and the bearings used are made to very high tolerances and in limited production.

A milling machine based on the use of revolute joints is believed to be capable of overcoming many of the disadvantages inherent in the use of sliding motion. Rotational joints are generally less expensive, easier to produce to high tolerances, and require less maintenance. Like a robot arm, a machine tool with stiff arms moveable about rotational (or revolute) joints should be capable of producing any motion with quite high accuracy and precision. As a conventional mill can cut complex curved surfaces using numeric control of several linear axes, a revolute mill could use numeric control to produce both straight and curves surfaces with rotational motion. The design concept can easily be implemented in machines having from two to five axis of revolute motion.

One advantage of the use of revolute motion in the control of tool position is the potential for lower cost. The production of tapered roller bearings is of much higher volume than linear bearings, and their cost is lower. At the same time they can easily be pre-loaded to provide very high stiffness and provide very accurate rotation travel. Similarly, the production of circular shafts and bores for mounting the bearings is typically easier and less expensive than the production of flat surfaces. Very accurate boring and turning machine tools currently exist, but linear systems must often be hand scraped and lapped if high accuracy is required. Finally, because less constraints exist on the size of the machine and its load bearing members, the possibility exists to make the machine stiffer than conventional milling machines.

Besides advantages in the construction of a machine tool, the use of revolute joints also has advantages in view of wear and maintenance. The use of revolute motion results in less degradation of accuracy with bearing wear and uses more commonly available, less expensive replacement bearings. When being reconditioned, the revolute motion machine requires less machining operations to true the precision surfaces than a linear travel machine would. A milling machine typically operates near the center of its travel at all times. The result of this is the center portion of the bearing surfaces or the bearings at the center of the table tend to wear out more quickly than those at the edges. This wear results in inaccurate table motion and thus machine reconditioning or adjustment becomes necessary. To address the condition, the surfaces that the bearings run on must be trued, the bearings must be replaced, and the machine must be adjusted. This can be very expensive.

Using revolute joints with highly pre-loaded bearings, the wear of the machine has less effect on accuracy. As the machine wears the pre-load decreases, but until a severe amount of wear has occurred the machine will still run as true as it did initially. This means that bearing replacement occurs less often than with linear systems, even if the linear systems are also pre-loaded (a difficult and expensive proposition). When the bearings must be replaced, they generally can be bought locally. No machining is necessary. The system must be adjusted after bearing replacement, as must a conventional milling machine.

Another advantage of the use of revolute joints is the small package size. A typical milling machine moves the table, and hence requires clearance on each side of the table. In the case of a revolute mill where the table only moves perpendicular to the work surface, the spindle is contained within the boundaries of the table, and thus less clearance is needed around the machine. The result is slightly lower work space footprint requirement than a conventional milling machine for equal workpiece sizes.

A final advantage of the revolute concept is its flexibility in application resulting from several factors.

First, the cutting head work holding elements of a revolute machine can easily be made to swing outside the normal working position, so that the machine can serve as its own loader and tool changer. Second, because the drive and bearing elements of revolute machine are located away from the work area, space around and under the work area can be used for additional axes of articulation. Thus, it will be relatively easy to build machines serving universal purpose, such as combined milling and turning machines.

Proposals have been made in the past to provide machine tools based on the concept of multiple axes of revolute motion. These efforts have largely been equivalent to a robot arm which models the human arm in which long arms are provided between revolute motion joints. Torque is applied by tangential actuators at the joints. These devices suffer the disadvantage of having a relatively low stiffness. In milling machine tool applications stiffness is of paramount importance. Although active tool and workpiece positioning systems based on closed loop control could be provided as a means of overcoming a lack of structural stiffness, such systems cannot completely overcome such an inherent defect. Such systems would possess low resonance frequency conditions which could not be fully addressed through feedback control systems. In order to be commercially acceptable a machine tool such as a milling machine based on revolute motion must possess exceptionally high rigidity in order to at least equal currently available numerically controlled milling machines based on translational movement.

In accordance with the revolute motion machines of this invention, high structural stiffness of the machine tool is provided through incorporation of the number of features. The arms of the machine tool according to this invention utilizes the concept of a structurally efficient three-dimensional truss. When viewing one of the revolute arms in a direction parallel to its axis of rotation, a three sided truss structure is defined with the revolute joint bearing defining one corner of the truss, and the tangential actuator drive point and the driven end defining the other two corners of the triangle truss structure.

Depending on the function of the arm, the driven end is coupled to a workpiece supporting table, spindle, or another arm. Preferably the distance between the tangential actuator drive point and the axis of rotation is large as compared with the distance between the axis of rotation and the driven end, as a means of enhancing stiffness. The arms of the machine of this invention also define an efficient three-sided truss when viewed perpendicular to the axis of rotation. A pair of bearings at the revolute motion axis are widely separated thus defining a long length side of the truss structure. These features provide high stiffness in directions tangent to the motion of the driving end and in a direction parallel to the axis of rotation. The high column stiffness of the arms provides radial stiffness.

A high degree of stiffness of the machine tool according to this invention is also enhanced through use of specially designed tangential actuators which provide low backlash and high stiffness. One type of actuator believed suitable for such application is a partial rotary driven cable actuator as described in this specification.

In addition to the design of the revolute motion arms themselves, aspects of this invention also relate to particular manners of coupling of various revolute motion arms to provide the number of degrees of freedom necessary for a given machine tool application.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 5 is a pictorial view of the tangential actuator of the milling machine shown in the previous Figures.

FIG. 6 is a view of the tool positioning articulating arms of the machine shown in FIG. 1 through 3 shown in a 90° rotated position.

FIG. 7 is a view of one of the revolute motion arms showing its truss like configuration when viewed novel to its plane of rotation.

FIG. 8 is a view of one of the revolute motion arms showing its truss like configuration when viewed along the plane of rotation.

DETAILED DESCRIPTION OF THE INVENTION

Figure 1:
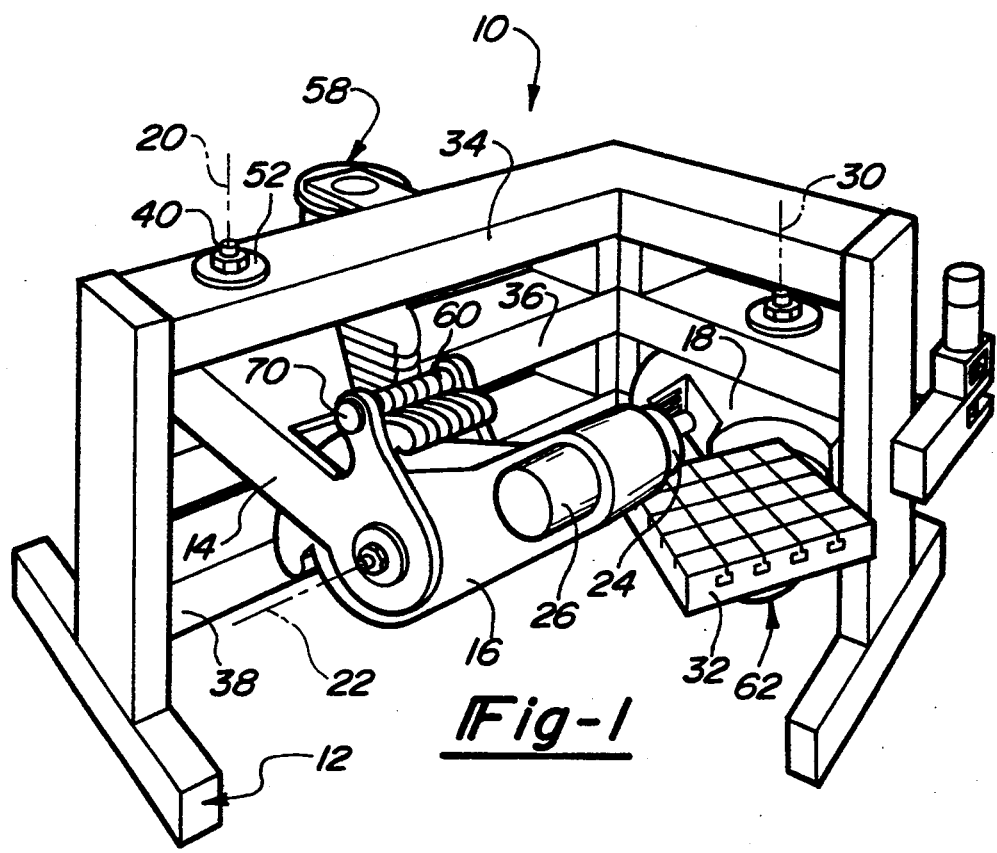
FIG. 1 is a pictorial view of a revolute milling machine in accordance with a preferred embodiment of this invention.
Figure 2:
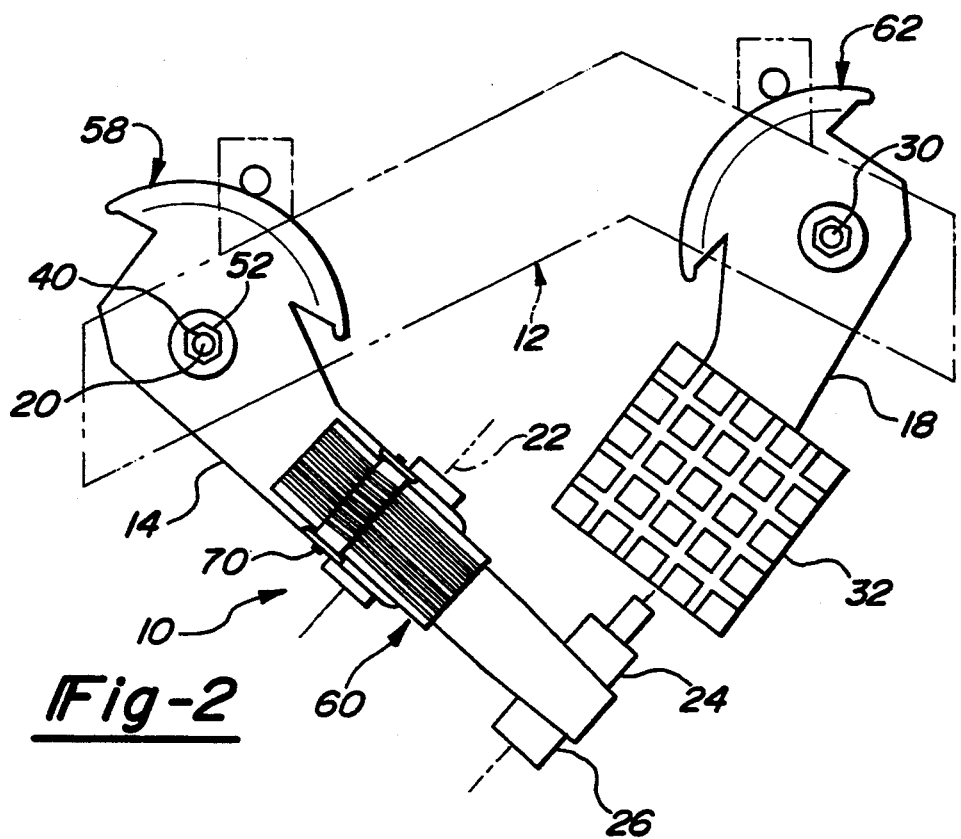
FIG. 2 is a plane view of a milling machine shown in FIG. 1.
Figure 3:
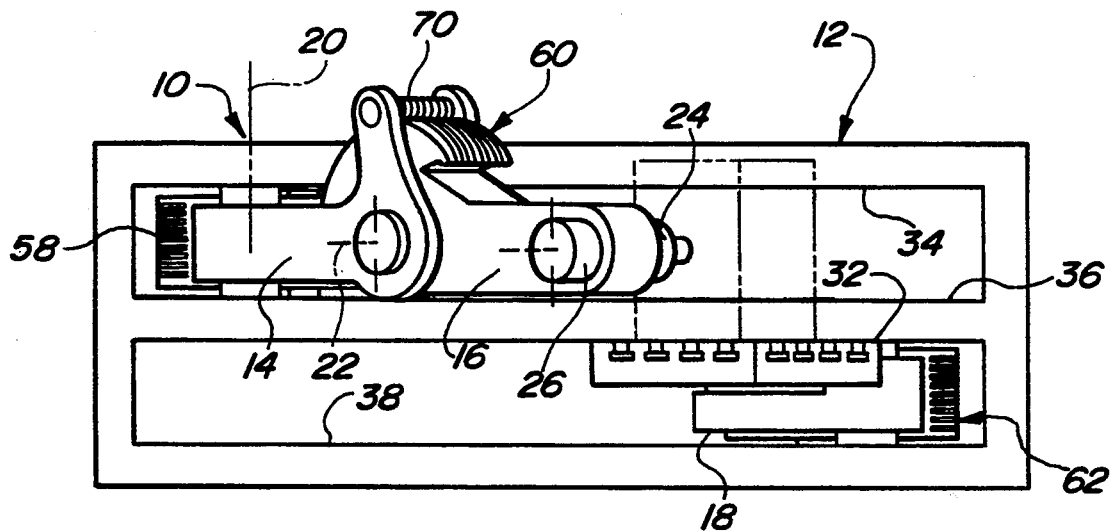
FIG. 3 is an elevational view of the milling machine shown in FIG. 1.

With reference to FIGS. 1, 2 and 3, a milling machine is shown incorporating features of this invention and is generally designated by reference number 10. Milling machine 10 principally includes base 12, and three arms 14, 16 and 18. Milling machine 10 as shown in FIG. 1 provides revolute motion about three axes. Such a milling machine would provide an adequate degree of tool and workpiece positioning flexibility for many applications. However, in order to provide the ability to position a tool at any desired point in cartesian space, five degrees of freedom would be required and can be provided in accordance with the teachings of this invention.

As shown in the Figures, arm 14 rotates about a vertical axis 20, whereas arm 16 rotates with respect to arm 14 about horizontal axis 22. At the end of arm 16 is positioned spindle 24 having a chuck for mounting a rotary tool (not shown). FIG. 6 provides another view of the arm assembly comprising arms 14 and 16. Power can be supplied to spindle 24 by various means, but is shown as provided by motor 26 mounted directly to arm 16. Arm 18 is rotatable with respect to base 12 about vertical axis 30 and supports workpiece table 32.

Base 12 is configured as a shelved structure defined by three layers 34, 36 and 38. Each layer is composed of sections of tubing which are welded together. While various materials can be used for forming base 12, steel tubing provides high torsional stiffness due to its closed section configuration. Arm 14 is supported by kingpin 40 which spans between top layer 34 and intermediate layer 36, whereas arm 18 is supported in a similar fashion between the intermediate layer 36, and the lower layer 38.

Figure 4:
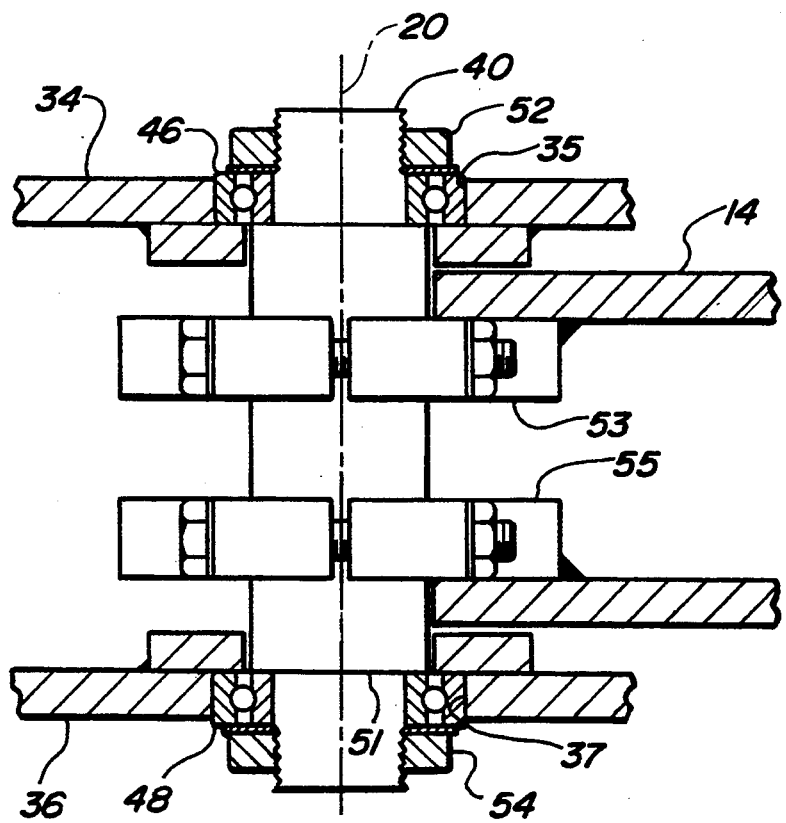
FIG. 4 is a sectional view through one of the revolute joints of the machine shown in FIGS. 1 through 3.

Now with reference to FIG. 4 a detailed illustration of the bearing arrangement used for coupling arm 14 to base 12 is shown. Kingpin 40 is shown positioned through bores 35 and 37 in the walls of the tubing defining layers 34 and 36. A pair of tapered roller bearings 46 and 48 are provided. These bearings are selected to have high precision with a very small radial run-out characteristic. Roller bearings 46 are journaled on kingpin 40 and are clamped by nuts 52 and 54, and shoulders 50 and 51 of the kingpin to a desired preload. Arm 14 is affixed to kingpin 40 through clamps 53 and 55.

In order to precisely control the milling machine 10, rotary encoders are required (not shown) so that the precise position of the arms can be monitored for closed loop control. Various configurations of readily available rotary encoders can be implemented.

For each of arms 14, 16 and 18, tangential actuators 58, 60 and 62 are provided. Actuators 58, 60 and 62 provide the ability to control the angular positioning of the arms with a high degree of accuracy and stiffness and with virtually zero backlash. One of the most promising types of actuators for this application is the rotary driven cable drive type which is shown in FIG. 5. Although FIG. 5 depicts actuator 60, the other actuators 58 and 62 are identical.

Tangential actuator 60 include a drum segment 64 which forms a semi-circle centered at axis of rotation 22. Drum segment 64 has a grooved face 66 which provides channels for nesting wraps of flexible cable 68. Both ends of cable 68 are securely fastened to the drum. A tensioning spring (not shown) or other tensioning device can be used to maintain a desired cable tension. Each cable segment 68 wraps around capstan 70 which is driven for rotation by a secondary reduction system, comprising DC motor 65 which drives primary pulley 67. Belt 69 wraps around primary pulley 67 and larger diameter secondary pulley 71. Tension on belt 69 is maintained by tensioner pulley 73. For the sake of simplifying FIGS. 1 through 3, the secondary reduction systems for the tangential actuators are not shown. This type of drive system provides zero backlash which is very important in maintaining positioning of the cutting tool since, in operation, the system is subject to reversing loads. The actuator stiffness and backlash advantages are the result of using multiple segments of cable 68 wrapped around the capstan 70 and drum 64. This type of tangential actuator also has a long lifetime in that very little wear occurs during use. Moreover, any weakening of a single cable segment has a minimal effect on the entire system.

FIG. 2 is a plan view of machine 10 which illustrates how coordinated movement between spindle 24 and table 32 is provided. As is evident, rotation about the various axes of rotation provide coordinated movement between spindle 24 and table 32.

Another feature which provides structural rigidity of the milling machine of this invention is the truss like configuration of arms 14, 16 and 18. An illustration of this feature is provided with reference to FIG. 7 which illustrates arm 16. In that Figure, the pivot axis represented by kingpin 50 is shown in relation to capstan 70 and spindle 24. As shown a triangle is formed with truss leg 72 formed between kingpin 50 and spindle 24 (i.e. the driven end of the arm), leg 74 between the spindle and the point of tangency between capstan 70, and leg 76 completing the triangle between the tangency point and the kingpin. In prior art revolute machines, the length of leg 76 or the "drive radius" of the actuator is small as compared with the length of the arm defined as leg 72. However, in accordance with this invention, the drive radius or length of leg 76 is large as compared with the length of the leg 72 which contributes to the stiffness and rigidity of the machine. Preferably leg 76 is at least one-half the arm length as defined by leg 72. In an experimental embodiment of this invention, a drive radius approaching the arm length was provided for exceptional stiffness.

An efficient truss configuration is also provided when viewing arm 16 in a plane perpendicular to the axis of kingpin 50 as shown in FIG. 8. The separation of main bearings 46 and 48 defines a truss leg 78 and another pair of legs 80 and 82 are defined by lines between the two bearings and spindle 24 (i.e. the driven end). Again this truss is configured such that each leg is a large proportion of any other leg length thus providing the advantages of an efficient truss structure in terms of structural efficiency. Preferably, leg 78 has a length at least one-half the length of arm 16 as measured between axis of rotation 22 and spindle 24.

Figure 9:
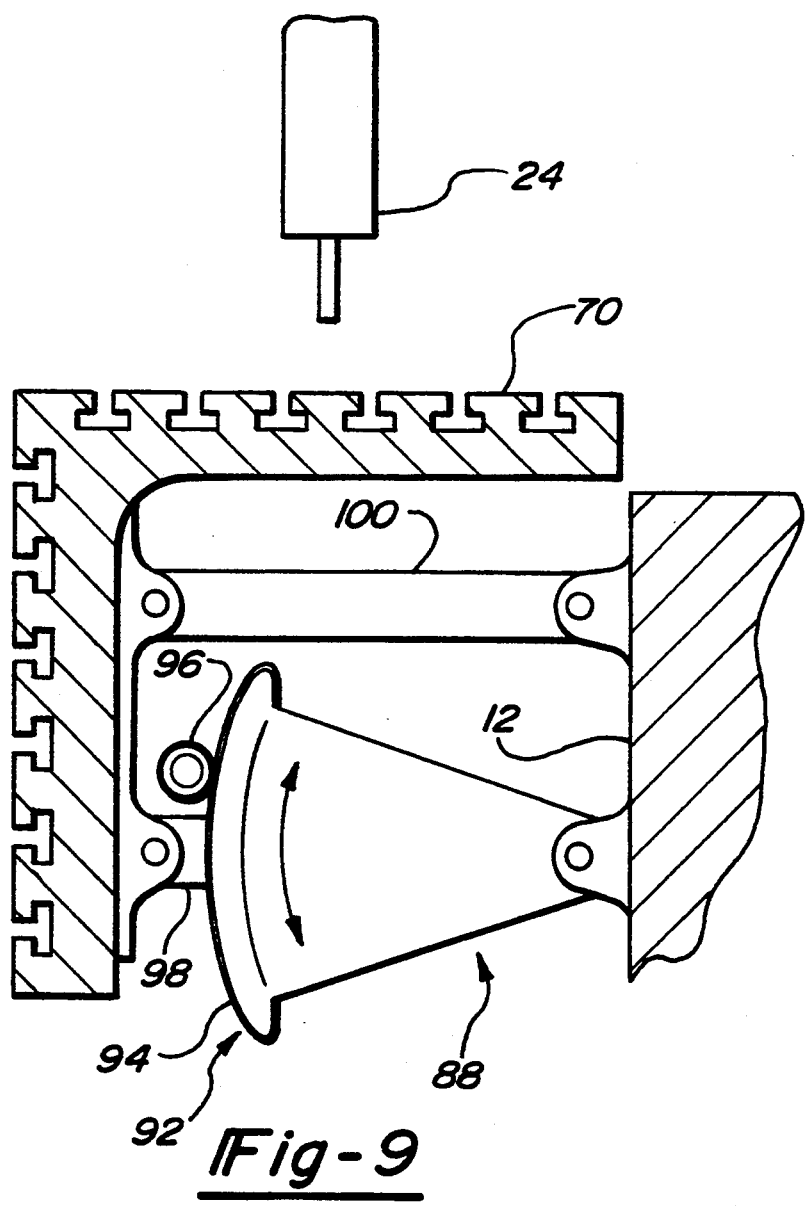
FIG. 9 is a diagrammatic elevational view of an alternate embodiment of a revolute arm based on a parallelogram four-bar linkage shown being used to position the workpiece supporting table.

With reference to FIG. 9 an alternate embodiment of a revolute motion machine tool arm is shown which is designated by reference number 88. Arm 88 is a four-bar parallelogram type linkage which provides for arcuate irrevolute motion of all points on the linkage. Arm 88 is shown for supporting workpiece table 90 which is shown relative to spindle 24. Arm 88 includes tangential actuator 92 which, like the previously described actuators includes drive segment 94 and capstan 96. Tangential actuator 92 operates in a manner identical to those previously described. Tangential actuator 92, however, in this embodiment features an extension leg 98 which is pinned for rotation relative to table 90. Guide link 100 is also pinned for rotation with respect to base 12 and table 90. Table 90, guide link 100, base 12 and actuator 92 define the four links of the four-bar linkage. By maintaining the effective length of tangential actuator 92 and guide link 100 identical, while also maintaining the separation of the pivot points at table 90 and base 12 identical, a parallelogram four-bar linkage arrangement is provided. The irrotational movement provided by the embodiment may be advantageous in a particular machine tool application.

Although arm 88 is shown as a means of supporting table 90 relative to base 12 that type of parallelogram type linkage could also be used for the other arms of a multi-axis revolute machine in accordance with this invention.

Milling machine 10 shown in the illustrations which accompany this specification provides three axes of revolute motion. The teachings of this invention could be implemented in two, four or five degree of freedom milling machine. Moreover, the machine incorporating these features can be used for other machining purposes aside from milling. This invention could also be implemented in a coordinate measuring machine in which a touch probe or non-contact probe is placed against various points on a surface of a workpiece as a means of modeling or digitizing that workpiece. In the embodiment shown, workpiece table 32 is rotatable about arm 18. In an alternate implementation of this invention, table 32 could be rigidly affixed to base structure 12, or conversely, the table could be moveable with spindle 24 fixed. In addition, it would be possible to provide additional degrees of freedom based on translational movement. For example, spindle 24 could provide linear advancement of a tool such as a mill or drill as a means of providing an additional degree of freedom in the positioning between the workpiece and tool.

While the above description constitutes the preferred embodiments of the present invention, it will be appreciated that the invention is susceptible of modification, variation and change without departing from the proper scope and fair meaning of the accompanying claims.

It is claimed:

1. A machine tool for providing coordinated positioning and movement between a tool and a workpiece, comprising:

a frame, a first arm coupled to said frame by a first revolute joint providing rotation of a driven end of said first arm about a first axis, a first tangential actuator for providing angular displacement of said first arm about said first axis, a second arm coupled to either said frame or said first arm by a second revolute joint providing rotation of a driven end of said second arm about a second axis, a second tangential actuator for providing angular displacement of said second arm about said second axis, means for mounting said tool and said workpiece to said machine tool such that displacement of said driven ends about said first and second axes provide said coordinated positioning and movement between said tool and said workpiece, and at least one of said tangential actuators having a cylindrical sector having a center of generation coincident with said first or second revolute joint and a capstan mounted adjacent said sector with wraps of a plurality of flexible cable segments having ends fixed to said sector and wrapped around said capstan.

2. A machine tool according to claim 1 wherein said second arm is coupled to said first arm driven end and said tool is mounted to said second arm driven end.

3. A machine tool according to claim 2 wherein said workpiece mount is coupled to said frame through said second arm.

4. A machine tool according to claim 1 wherein both said first and said second tangential actuators comprise a cylindrical sector having a center of generation coincident with said first or second revolute joint and a capstan mounted adjacent said sector with wraps of a plurality of flexible cable segments having ends fixed to said sector and wrapped around said capstan.

5. A machine tool according to claim 1 wherein said sector is defined by a radius relative to said axis of rotation which is at least one-half the length of said first or second arm as measured between said axis of rotation and said driven end of said first or second arm.

6. A machine tool according to claim 1 wherein said first or second arm includes a pair of rotational bearings mounted at separated positions along said axis of rotation and are separated by a distance measured along said axis of rotation which is at least one-half the length of said arm as measured between said axis of rotation and said driven end of said arm.

7. A machine tool according to claim 1 wherein at least one of said first or second arm further comprises joined first, second and third links which together form a four-bar linkage with said first or second arm defining one bar of said linkage.

8. A machine tool for providing coordinated positioning and movement between a tool and a workpiece, comprising:
a frame,
a first arm coupled to said frame by a first revolute joint providing rotation of a driven end of said first arm about a first axis,
a first tangential actuator for providing angular displacement of said first arm about said first axis,
a second arm coupled to either said frame or said first arm by a second revolute joint providing rotation of a driven end of about a second axis,
a second tangential actuator for providing angular displacement of said second arm about said second axis,
means for mounting said tool and said workpiece to said machine tool such that displacement of said driven ends about said first and second axes provide said coordinated positioning and movement between said tool and said workpiece, and
at least one of said tangential actuators having a drive radius of at least one-half the length of said arm as defining between said axis of rotation and said driven end.

9. A machine tool according to claim 8 wherein said first or second arm includes a pair of rotational bearings mounted at separated positions along said axis of rotation and are separated by a distance measured along said axis of rotation which is at least one-half the length of said arm as measured between said axis of rotation and said driven end of said arm.

10. A machine tool according to claim 8 wherein said second arm is coupled to said first arm driven end and said tool is mounted to said second arm driven end.

11. A machine tool according to claim 10 wherein said workpiece mount is coupled to said frame through said second arm.

12. A machine tool according to claim 8 wherein at least one of said first or second arm further comprises joined first, second and third links which together form a four-bar linkage with said first or second arm defining one bar of said linkage.

13. A machine tool for providing coordinated positioning and movement between a tool and a workpiece, comprising:
a frame,
a first arm coupled to said frame by a first revolute joint providing rotation of a driven end about a first axis,
a first tangential actuator for providing angular displacement of said first arm about said first axis,
a second arm coupled to said first arm by a second revolute joint providing rotation of a driven end about a second axis,
a second tangential actuator for providing angular displacement of said second arm about said second axis,
means for mounting said tool to said second arm-driven end,
a third arm coupled to said frame by a third revolute joint providing rotation of a driven end about a third axis,
a third tangential actuator for providing angular displacement of said third arm about said third axis, and
means for mounting said workpiece to said third arm driven end, whereby angular displacement about said first, second and third axes provides said coordinated positioning and movement between said tool and said workpiece.

14. A machine tool according to claim 13 wherein at least one of said tangential actuators having a semi-cylindrical sector having a center of generation coincident with said first, second or third revolute joint and a capstan mounted adjacent said sector with a plurality of wraps of cable having ends fixed to said sector and wrapped around said capstan.

15. A machine tool according to claim 13 wherein said first and third axes are vertical axes and said second axis is a horizontal axis.

* * * * *